Jan. 9, 1962     P. A. YOCUM     3,016,077

SELF-LOCKING SCREW

Filed Dec. 8, 1958

INVENTOR.
PAUL A. YOCUM
BY
William Cleland
Attorney

_United States Patent Office_

3,016,077
Patented Jan. 9, 1962

3,016,077
SELF-LOCKING SCREW
Paul A. Yocum, 524 E. Ford Ave., Barberton, Ohio
Filed Dec. 8, 1958, Ser. No. 778,662
5 Claims. (Cl. 151—70)

This invention relates to screws and bolts and in particular relates to self-locking screws.

Heretofore, screws of the character described have been provided with various means for locking the same against accidental removal from a part in which they are screw threaded, such as when threads become stripped in the screw or the part. These have been generally unsatisfactory for various reasons, such as that the locking means was too complicated and expensive, or that the locking means was easily lost, or that the locking means was not adjustable or reusable.

One object of the present invention is to provide a simple, compact locking device for a screw member, which is not subject to becoming lost or misplaced such as when the screw member is removed from said part.

Another object of the invention is to provide a locking device of the character described, which is readily releasable from locking engagement by pressure of a screw driver, or like tool used for removing the screw from threaded connection with said part.

Another object of the invention is to provide a locking device of the character described, which is adapted to be provided either in combination with a screw member or provided separately in quantity for subsequent incorporation in a screw member.

These and other objects of the invention will be manifest from the following brief description and the accompanying drawings.

Figure 1:
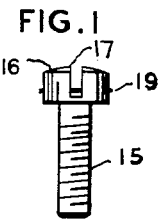
FIGURE 1 is a front view of a setscrew or bolt having self-locking means incorporated therein in accordance with the invention.
Figure 2:
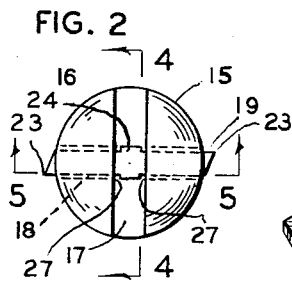
FIGURE 2 is an enlarged top plan view of FIGURE 1.
Figure 3:
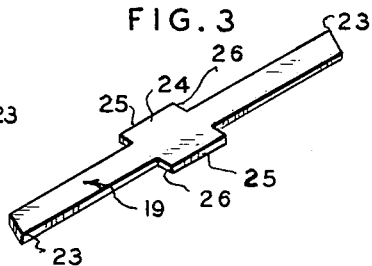
FIGURE 3 is a further enlarged perspective view of the locking element removed from the setscrew of FIGURES 1 and 2.

Referring to the form of the invention shown in FIGURES 1 to 6, and in particular to FIGURES 1 and 2, there is shown a setscrew or bolt 15 having a fillister head 16 provided with an axially inwardly extending screw-driver slot 17. Extending radially of the axis of the screw, diametrically through the head, may be a cylindrical passage or bore 18, at least the upper half of which communicates with said slot, the passage 18 having mounted therein a self-locking element 19, adapted to prevent rotation of the screw with respect to a part 20, in which the screw is mounted with the fillister head in a countersink or counterbore 21 in the part (see FIGURE 5).

Figure 4:
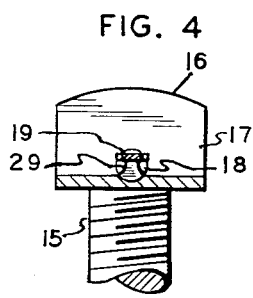
FIGURE 4 is a vertical cross-section taken substantially on the line 4—4 of FIGURE 2, and on the same scale.
Figure 5:
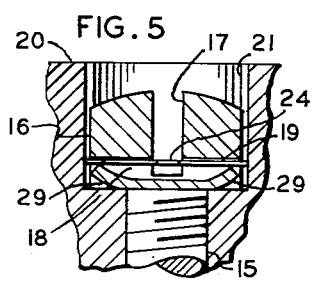
FIGURE 5 is a vertical cross-section, taken substantially on the line 5—5 of FIGURE 2, on the same scale, but showing the screw in self-locking condition in a structural part.

The locking element 19 may be a narrow strip of flat springy metal, such as spring steel, terminating at both ends in more or less sharp protuberances or corner edges 23, 23, the length of the strip being such that in its normal extended or flat condition these edges will frictionally engage the wall of the counterbore 21, as shown in FIGURE 5. To prevent removal of the element from the screw, as when removed from the part 20, it may have a flat central enlargement 24, providing oppositely disposed shoulder means 25 which are adapted to pass through the passage 18 along the widest portion of the same, but providing four shoulders 26, 26 which will be in stop engagement with the four corresponding corners 27, 27 at the juncture of passage 18 and the screw-driver slot 17, when the element is elevated to the top of the passage (see FIGURES 2, 4 and 5). For holding the element so elevated, spaced supporting tangs 29, 29 may be peened or otherwise formed upwardly in the material of the head 19, at opposite ends of the passage 18, as shown in FIGURES 4 and 5. In other words, the element 19 is unsupported between the tangs 29, and is held elevated by the tangs so that it cannot be removed from the screw.

Figure 6:
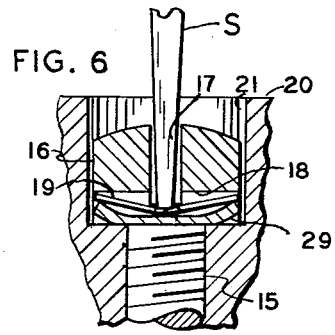
FIGURE 6 is a cross-section corresponding to FIGURE 5, but showing the screw in unlocked condition in the structural part.

In use of the set screw 15, as for holding a part 20, such as a turning knob, on a shaft (not shown), it is screwed into place by a screw driver S while the latter is held pressed against the element, yieldingly to bend the same between the two tangs, and thereby to hold the ends of the element released from engagement with the wall of the counterbore 21, as shown in FIGURE 6. Upon release of the screw driver, when the screw is properly postioned with the head 19 thereof within the counterbore 21 of part 20, the element will spring to its normal extended condition, in which the opposite ends firmly grip the wall of counter bore 18. The element is similarly held released from engagement with wall of the counterbore when it is desired to loosen the screw 18, or to remove it from part 20.

Figure 7:
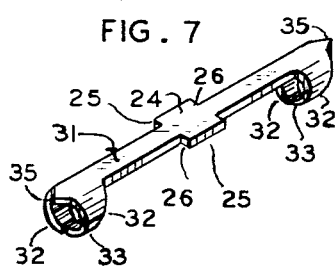
FIGURE 7 is a perspective view corresponding to FIGURE 3, illustrating a modified form of locking element.
Figure 8:
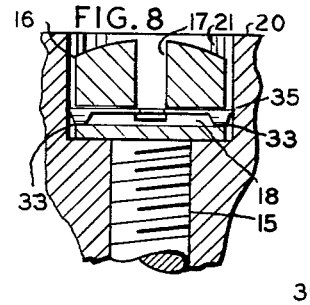
FIGURE 8 is a cross-section corresponding to FIGURE 5, illustrating the locking element of FIGURE 7 in locking position.

The modification shown in FIGURES 7 and 8 is similar to the structure shown in FIGURES 1 to 6, except that a locking element 31 of thin, springy metal is provided at each end with laterally oppositely disposed narrow tangs 32, 32, which are arcuately formed to provide longitudinally spaced circular portions 33, 33, of slightly smaller diameter than bore 34. Like parts, therefore, are given like numerals, unless otherwise noted.

Element 31 is easily inserted in bore 34 upon yieldingly bending the same to permit passage of the central stop enlargement 24 through the bore, until the enlargement 24 is held in stop position in slot 17 by being supported on the spaced portions 33 within bore 18, as shown in FIGURE 8. Points 35, 35 formed on the ends of the element are frictionally engageable with the wall of the counter bore 21, as before. For releasing the element from said frictional engagement, the circular portions 33 serve as fulcrums when the element is downwardly depressed by a screw driver S or like tool, in the manner shown in FIGURE 6.

Figure 9:
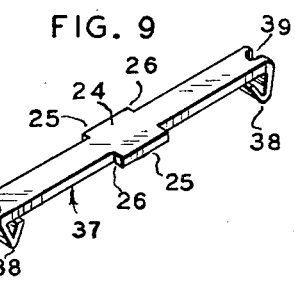
FIGURES 9 and 10 are views corresponding to FIGURES 7 and 8, respectively, illustrating another form of the invention.
Figure 10:
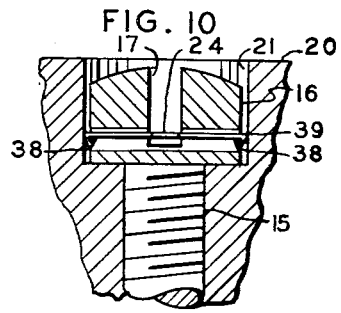

FIGURES 9 and 10 illustrate another form of locking element 37 which functions substantially in the manner described in connection with FIGURES 7 and 8. The opposite ends of the element 37, however, are longitudinally reversibly bent to form downwardly presented beaded fulcrum portions 38, 38, which serve the same purpose as the fulcrum portions 33 on element 31 described above. Protruding outer ends of the fulcrum portions may be provided with suitable non-slip means, such as apertures 39, for non-slip engagement with the wall of counterbore 21 of part 20.

Figure 11:
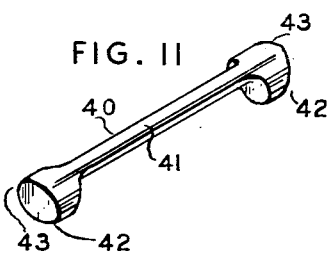
FIGURE 11 is a perspective view, corresponding to FIGURES 3, 7 and 9, illustrating still another modified form of locking element.
Figure 12:
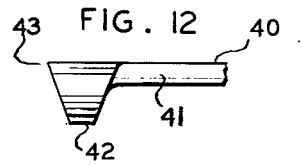
FIGURE 12 is a fragmentary front elevation of one end of the locking element shown in FIGURE 11.

FIGURES 11 and 12 illustrate another modified form of locking element 40, formed of solid springy metal to have an elongated flexible central portion 41 terminating in cylindrical end enlargements 42, 42. The outermost end portions of the enlargements are undercut, as best shown in FIGURE 12, to present sharp upper edges 43 for engagement with the wall of counterbore 21, in the manner and for the purposes described in connection with FIGURES 7 and 8.

Other modifications of the invention may be resorted to without departing from the spirit thereof, or the scope of the appended claims.

What is claimed is:

1. A self-locking screw device, comprising a screw member having a head for reception in a counterbore in a part into which the screw is to extend, said head having an axially inwardly extending turning-tool receiving recess and a cylindrical passage extending radially through said head and at least the upper half of said passage communicating with said recess, and an elongated element of relatively stiff but springy material received through said passage with pointed opposite ends extending beyond said head for yielding frictional engagement with the counterbore wall of the part to resist relative rotation of said member with respect to said part, said element having adjacent each end a projection in engagement with the bottom of said passage supporting said element in the upper half of said passage to be bendable intermediate the projections, whereby a turning-tool is axially insertable through said recess for yielding depression of the element, thereby to release engagement of said opposite ends from the counterbore wall of the part, said element having integral shoulder means engaging said recess when said element is in the upper half of said passage for retaining the same centered in said passage in the head to prevent removal of the element from said passage at least in the undepressed position thereof and to maintain the same centered in said passage.

2. A self-locking screw device, comprising a screw member having a head for reception in a counterbore in a part into which the screw is to extend, said head having an axially inwardly extending turning-tool receiving recess and a cylindrical passage extending radially through said head and the narrowing upper portion of said passage communicating with said recess, and an elongated element of relatively stiff but springy material received through said passage with pointed opposite protrusion means extending beyond said head for yielding frictional engagement with the counterbore wall of the part to resist relative rotation of said member with respect to said part, cooperating means adjacent each end of said element for supporting the element in the upper half of said passage to be bendable intermediate the projections, whereby a turning-tool is axially insertable through said recess for yielding depression of the element, thereby to release engagement of said opposite ends from the counterbore wall of the part, said element having integral shoulder means engaging said tool-receiving recess at said narrowing upper portion of said passage when said element is in the upper half of said passage for retaining the element centered in said passage in the head to prevent removal of the element from said passage at least in the undepressed position thereof and to maintain the same centered in said passage.

3. A screw device as set forth in claim 2, said cooperating means including projections adjacent each end of said element in engagement with the bottom of said passage means for supporting the element in the upper portion of the passage means.

4. A screw device as set forth in claim 2, said element being of flat springy metal and said shoulder means being opposite integral extensions therefrom.

5. A screw device as set forth in claim 2, said element being of flat springy metal and said shoulder means being opposite integral extensions therefrom, said cooperating means being upwardly presented portions in said passage means engaging said element adjacent each end thereof.

References Cited in the file of this patent

UNITED STATES PATENTS

| | | |
|---|---|---|
| 1,784,026 | Olson | Dec. 9, 1930 |
| 1,845,428 | Llewellyn | Feb. 16, 1932 |